United States Patent Office 3,455,927
Patented July 15, 1969

1

3,455,927
PHENYLPIPERAZINYLALKYLSULFAMIDES
John J. Lafferty, Levittown, and Charles L. Zirkle, Berwyn, Pa., assignors to Smith Kline & French Laboratories, Philadelphia, Pa., a corporation of Pennsylvania
No Drawing. Filed Nov. 17, 1966, Ser. No. 595,037
Int. Cl. C07d 51/70
U.S. Cl. 260—268                    10 Claims

ABSTRACT OF THE DISCLOSURE

Phenyl (or substituted phenyl) piperazinylalkylsulfamides having antidepressant activity are prepared by reaction of a phenylpiperazinylalkylamine with either sulfamide or a sulfamoyl chloride. Both the N- and N'-positions of the sulfamide group may be alkyl substituted and in addition the N'-position may be incorporated into a ring forming a heterocyclic amino group. The latter are prepared by reaction of an N-acyl-N-chlorosulfonylphenylpiperazinylalkylamine with a heterocyclic amine.

---

This invention relates to novel phenylpiperazinylalkylsulfamides having useful pharmacodynamic acitivity. More specifically the compounds of this invention have antidepressant activity as measured by standard pharmacological procedures in animals. Exemplary of the antidepressant profile shown by the compounds of this invention after oral administration is the enhanced responding in the observing behavior of pigeons with a low order of avoidance blocking activity in monkeys. These compounds are approximately equipotent to imipramine.

The novel phenylpiperazinylalkylsulfamides of this invention may be represented by the following general structural formula:

$$R_1-N\diagup\diagdown N-A-NSO_2N\diagup^{R_3}_{\diagdown R_4}$$
$$\quad\quad\quad\quad\quad\quad\quad |$$
$$\quad\quad\quad\quad\quad\quad R_2$$

Formula I in which:

A represents an alkylene chain, straight or branched, of from 2 to 6 carbon atoms, preferably 2 to 4 carbon atoms;

$R_1$ represents phenyl, halophenyl, trifluoromethylphenyl, lower alkylphenyl, lower alkoxyphenyl, lower alkylthiophenyl, dihalophenyl, di-lower alkylphenyl, di-lower alkoxyphenyl or methylenedioxyphenyl;

$R_2$ represents hydrogen or lower alkyl; and $R_3$ and $R_4$ represent hydrogen, lower alkyl or, when taken together with the nitrogen atom to which they are attached form a heterocyclic amine of from 4 to 12 carbon atoms such as N-pyrrolidinyl, N-piperidinyl, N-piperazinyl, N'-lower alkyl-N-piperazinyl, N'-acetoxyethyl-N-piperazinyl or N'-hydroxyethyl-N-piperazinyl.

Preferred compounds of this invention are represented by the following formula:

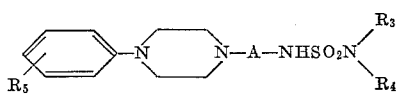

in which A represents an alkylene chain, straight or branched, of from 2 to 4 carbon atoms; $R_5$ represents hydrogen, halogen, lower alkyl, lower alkoxy, lower alkylthio or trifluoromethyl; and $R_3$ and $R_4$ represent hydrogen or lower alkyl.

A preferred compound of this invention is N-[3-(4-phenyl-1-piperazinyl)-propyl]-sulfamide.

2

The term halo where used herein denotes halogen moieties having an atomic weight of less than 80. By the terms lower alkyl, lower alkoxy and lower alkylthio where used herein groups having from 1 to 4, preferably 1 to 2, carbon atoms are indicated.

The nontoxic pharmaceutically acceptable acid addition salts of the compounds of Formula I are also included within the scope of this invention. Both organic and inorganic acids can be employed to form such salts, illustrative acids being sulfuric, nitric, phosphoric, hydrochloric, citric, acetic, lactic, tartaric, pamoic, ethane-disulfonic, sulfamic, succinic, cyclohexylsulfamic, fumaric, maleic, benzoic and the like. These salts are readily prepared by methods known to the art.

The novel compounds of this invention are prepared by one of several processes depending on the definition of $R_3$ and $R_4$. Thus where $R_3$ and $R_4$ both represent hydrogen the products are obtained by the following process:

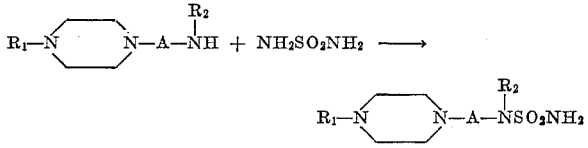

where $R_1$, A and $R_2$ are as defined above. As shown, a piperazinylalkylamine is reacted with sulfamide, preferably used in excess, in a solvent in which the reactants are substantially soluble, for example in water, at about 60–100° C. for about two to eight hours.

To prepare the novel compounds of Formula I where $R_3$ and $R_4$ are lower alkyl the following process is employed:

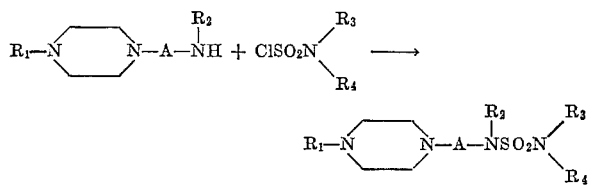

where $R_1$, A and $R_2$ are as defined above. Thus a piperazinylalkylamine is reacted with a di-lower alkylsulfamoyl chloride in an inert solvent such as an aromatic hydrocarbon, for example benzene or toluene, conveniently at from 25–40° C. for about 2–12 hours, preferably for about 4–6 hours. Advantageously two moles of the piperazinylalkylamine are employed for each mole of the sulfamoyl chloride.

The N'-mono-lower alkyl-N-piperazinylalkylsulfamides of this invention are prepared by treating the N-piperazinylalkylsulfamide with one equivalent of an alkylating agent such as a lower alkyl halide, for example a lower alkyl bromide or iodide, or a di-lower alkyl sulfate such as dimethylsulfate, conveniently at room temperature for about one to four hours, preferably about 3 hours.

A process for the preparation of the compounds of Formula I, particularly in which $R_3$ and $R_4$ together with the nitrogen atom to which they are attached form a heterocyclic amine, additionally involves the reaction of an N-acyl-N-chlorosulfonylpiperazinylalkylamine (prepared by reacting an N-acylpiperazinylalkylamine with sodium followed by sulfuryl chloride) with ammonia, a lower alkylamine or a heterocyclic amine in an anhydrous solvent such as ether, benzene or toluene at about 40–65° C. To prepare the compounds where $R_3$ and $R_4$ together represent the N'-hydroxyethyl-N-piperazinyl moiety, the N-acyl-N-chlorosulfonylpiperazinylalkylamine is reacted with N'-acetoxyethylpiperazine followed by hydrolysis of the resulting N'-acetoxyethyl-N-piperazinylalkylsulfamoylpiperazine.

The piperazinylalkylamines used as starting materials as described hereinabove are known or are prepared by methods known in the art. Exemplary of these are the condensation of an $R_1$ substituted piperazine with an alkylnitrile or omegahaloalkanoylamide followed by reduction of the condensation product. Alkylation of the piperazinylalkylamines with an appropriate alkyl halide gives the $R_2$ substituted starting materials. The $R_1$ substituted piperazines are prepared by known methods such as reaction of an appropriate aniline with bis($\beta$-bromoethyl) amine. Reference may be made to U.S. Patents 2,836,595; 2,833,770; and 2,722,529.

The novel compounds of this invention may be administered orally or parenterally in conventional dosage unit forms such as tablets, capsules, injectables or the like, by incorporating the appropriate dose of a compound of Formula I with carriers according to accepted pharmaceutical practices.

The foregoing is a general description of how to prepare the compounds of this invention. The following examples illustrate the preparation of specific compounds but should not be construed as limiting the scope of the invention set forth in Formula I.

EXAMPLE 1

A mixture of 21.9 g. (0.1 M) of 1-phenyl-4-(3-aminopropyl)-piperazine and 11.5 g. (0.12 M) of sulfamide in 100 ml. of water is refluxed for five hours. The reaction mixture is cooled and filtered to give N-[3-(4-phenyl-1-(piperazinyl)-propyl]-sulfamide, M.P. 155–156° C.

Similarly reaction with 1-phenyl-4-(2-aminoethyl)-piperazine yields the corresponding N-[2-(4-phenyl-1-piperazinyl)-ethyl]-sulfamide, M.P. 103–104° C.

EXAMPLE 2

Employing the general procedure of Example 1, the following piperazines are reacted with sulfamide to give the corresponding products:

A. Piperazine: 1-phenyl-4-(4-aminobutyl)-piperazine. Product: N-[4-(4-phenyl-1-piperazinyl)-butyl]-sulfamide.
B. Piperazine: 1-phenyl-4-(5-aminopentyl)-piperazine. Product: N-[5-(4-phenyl - 1 - piperazinyl)-pentyl]-sulfamide.
C. Piperazine: 1-phenyl-4-(2-aminopropyl)-piperazine. Product: N-[2-(4-phenyl - 1-piperazinyl)-propyl]sulfamide.

EXAMPLE 3

A mixture of 25.3 g. of 1-o-chlorophenyl-4-(3-aminopropyl)-piperazine and 11.5 g. of sulfamide in 100 ml. of water is refluxed for five hours and worked up as in Example 1 to give N-[3-(4-o-chlorophenyl-1-piperazinyl)-propyl]-sulfamide.

Similarly reaction with 29.8 g. of 1-o-bromophenyl-4-(3-aminopropyl)-piperazine yields the corresponding N-[3-(4-o-bromophenyl-1-piperazinyl)-propyl]-sulfamide.

EXAMPLE 4

Following the general procedure of Example 1, a mixture of 28.7 g. of 1-p-trifluoromethylphenyl-4-(3-aminopropyl)-piperazine (prepared from p-trifluoromethylaniline by reaction with bis-$\beta$-bromoethylamine followed by alkylation with acrylonitrile and reduction of the resulting cyanoethyl derivative) and 11.5 g. of sulfamide in 150 ml. of water is refluxed for six hours to give after workup N-[3-(4-p-trifluoromethylphenyl - 1-piperazinyl)-propyl]-sulfamide.

Similarly reaction with 23.3 g. of 1-p-tolyl-4-(3-aminopropyl)-piperazine prepared from p-tolylaniline as described above yields the corresponding N-[3-(4-p-tolyl-1-piperazinyl)-propyl]-sulfamide.

EXAMPLE 5

A mixture of 12.5 g. of 1-o-methoxyphenyl-4-(3-aminopropyl)-piperazine (prepared from 1-o-methoxyphenyl-piperazine by alkylation wtih acrylonitrile followed by reduction of the cyanoethyl intermediate) and 5.8 g. of sulfamide in 75 ml. of water is refluxed for six hours. Workup as described in Example 1 yields N-[3-(4-o-methoxyphenyl-1-piperazinyl)-propyl]-sulfamide.

Similarly reaction with 13.3 g. of 1-o-methylthiophenyl-4-(3-aminopropyl)-piperazine (prepared from o-methylthioaniline by reaction with bis-$\beta$-bromoethylamine followed by alkylation with acrylonitrile and subsequent reduction of the cyanoethyl derivative) and 5.8 g. of sulfamide gives N-[3-(4-o-methylthiophenyl-1-piperazinyl)-propyl]-sulfamide.

EXAMPLE 6

To 23.3 g. of 1-phenyl-4-(3-methylaminopropyl)-piperazine in 75 ml. of dry benzene is added 7.2 g. of dimethylsulfamoyl chloride in 10 ml. of benzene at 10° C. and the resulting mixture is stirred at 25° C. for 24 hours. The reaction mixture is washed with water, dried, concentrated and distilled to give N,N′,N′-trimethyl-N-[3-(4-phenyl-1-piperazinyl)-propyl]-sulfamide.

Similarly, reaction of 21.9 g. of 1-phenyl-4-(3-aminopropyl)-piperazine as described above yields N′,N′-dimethyl-N-[3-(4-phenyl-1-piperazinyl)-propyl]-sulfamide.

EXAMPLE 7

From 29.8 g. of N-[3-(4-phenyl-1-piperazinyl)-propyl]-sulfamide (prepared as in Example 1) and 2.5 g. of sodium hydride in dimethylformamide is obtained the sodio derivative which is treated with 14.2 g. of methyl iodide. The resulting mixture is stirred at room temperature for three hours. Extracting with ether, washing the extract with water, drying, concentrating and distilling gives N′-methyl-N-[3-(4-phenyl-1-piperazinyl)-propyl]-sulfamide.

EXAMPLE 8

By the procedure of Example 1, 28.7 g. of 1-(o,p-dichlorophenyl) - 4-(3-aminopropyl)-piperazine (prepared from o,p-dichloroaniline by reaction with bis-$\beta$-bromomethylamine followed by alkylation with acrylonitrile and reduction of the resulting cyanoethyl derivative) and 11.5 g. of sulfamide are reacted in aqueous solution and worked up to give N-[3-(4-o,p-dichlorophenyl-1-piperazinyl)-propyl]-sulfamide.

EXAMPLE 9

Employing the general procedure of Example 1, the following piperazines (prepared as outlined in Example 8 from corresponding aniline precursors) are reacted with sulfamide to give the indicated products:

A. Piperazine: 1-(o,m-dichlorophenyl)-4-(3 - aminopropyl)-piperazine. Product: N[3-(4-o,m-dichlorophenyl-1-piperazinyl)-propyl]-sulfamide.
B. Piperazine: 1-(o,p-dimethylphenyl)-4-(3 - aminopropyl)-piperazine. Product: N-[3-(4-o,p-dimethylphenyl-1-piperazinyl)-propyl]-sulfamide.
C. Piperazine: 1-(m,p-dimethoxyphenyl)-4-(3 - aminopropyl)-piperazine. Product: N-[3 - (4 - m,p - dimethoxyphenyl-1-piperazinyl)-propyl]-sulfamide.
D. Piperazine: 1-(m,p-methylenedioxyphenyl) - 4 - (3-aminopropyl)-piperazine. Product: N-[3-(4-m,p-methylenedioxyphenyl-1-piperazinyl)-propyl]-sulfamide.

EXAMPLE 10

An anhydrous benzene solution of 1-phenyl-4-(3-acetylaminopropyl)-piperazine is heated at reflux with sodium until a suspension is formed. To this suspension is added sulfuryl chloride in benzene solution. The resulting mixture is filtered and the filtrate is evaporated to dryness to give 1-phenyl-4-[3-(N-acetyl-N-chlorosulfonylamino)-propyl]-piperazine.

A mixture of 18.0 g. of the above prepared piperazine and 7.1 g. of pyrrolidine in 150 ml. of anhydrous benzene is heated at 50° C. for five hours, then cooled and filtered. The filtrate is treated with dilute hydrochloric acid and the organic layer is extracted with dilute sodium hydroxide solution. The alkaline solution is acidified and the precipitate is filtered to give N-[3-(4-phenyl-1-piperazinyl)-propylsulfamoyl]-pyrrolidine.

Similarly reacting piperidine, piperazine, N-methylpiperazine or N-acetoxyethylpiperazine with 1-phenyl-4-[3-(N-acetyl-N-chlorosulfonylamino)-propyl]-piperazine yields N-[3-(4-phenyl-1-piperazinyl) - propylsulfamoyl]-piperidine, N-[3-(4-phenyl-1-piperazinyl) - propylsulfamoyl] - piperazine, N'-methyl-N-[3-(4-phenyl - 1 - piperazinyl)-propylsulfamoyl]-piperazine and N'-acetoxyethyl-N-[3-(4-phenyl-1-piperazinyl)-propylsulfamoyl] - piperazine, respectively.

Hydrolysis with aqueous base of the thus prepared N'-acetoxyethylpiperazine derivative gives N'-hydroxyethyl-N-[3-(4 - phenyl-1-piperazinyl) - propylsulfamoyl]-piperazine.

What is claimed is:

1. A chemical compound or its salt with a pharmaceutically acceptable acid, said compound having the formula:

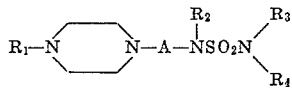

in which: A is an alkylene group of from 2 to 6 carbon atoms; $R_1$ is phenyl, halophenyl, trifluoromethylphenyl, lower alkylphenyl, lower alkoxyphenyl, lower alkylthiophenyl, dihalophenyl, di-lower alkylphenyl, di-lower alkoxyphenyl or methylenedioxyphenyl; $R_2$ is hydrogen or lower alkyl; and $R_3$ and $R_4$ are hydrogen, lower alkyl or when taken together with the nitrogen atom to which they are attached, N-pyrrolidinyl, N-piperidinyl, N-piperazinyl, N'-lower alkyl-N-piperazinyl, N'-acetoxyethyl-N-piperazinyl or N'-hydroxy-ethyl-N-piperazinyl.

2. A chemical compound according to claim 1 in which A is an alkylene group of from 2 to 4 carbon atoms; $R_1$ is phenyl, halophenyl, lower alkylphenyl, lower alkoxyphenyl, lower alkylthiophenyl or trifluoromethylphenyl; $R_2$ is hydrogen and $R_3$ and $R_4$ are hydrogen or lower alkyl.

3. A chemical compound according to claim 2 in which A is propylene and $R_3$ and $R_4$ are hydrogen.

4. A chemical compound according to claim 3 in which $R_1$ is phenyl, being the compound N-[3-(4-phenyl-1-piperazinyl)-propyl]-sulfamide.

5. A chemical compound according to claim 2 in which A is ethylene and $R_3$ and $R_4$ are hydrogen.

6. A chemical compound according to claim 5 in which $R_1$ is phenyl, being the compound N-[2-(4-phenyl-1-piperazinyl)-ethyl]-sulfamide.

7. A chemical compound according to claim 3 in which $R_1$ is o-chlorophenyl, being the compound N-[3-(4-o-chlorophenyl-1-piperazinyl)-propyl]-sulfamide.

8. A chemical compound according to claim 3 in which $R_1$ is p-trifluoromethylphenyl, being the compound N-[3-(4-p-trifluoromethylphenyl - 1 - piperazinyl)-propyl]-sulfamide.

9. A chemical compound according to claim 3 in which $R_1$ is o,p-dichlorophenyl, being the compound N-[3-(4-o,p-dichlorophenyl-1-piperazinyl)-propyl]-sulfamide.

10. A chemical compound according to claim 2 in which A is propylene, $R_1$ is phenyl and $R_3$ and $R_4$ are methyl, being the compound N',N'-dimethyl-N-[3-(4-phenyl-1-piperazinyl)-propyl]-sulfamide.

References Cited
UNITED STATES PATENTS
3,143,549  8/1964  Lafferty et al.

ALEX MAZEL, Primary Examiner
A. M. TIGLE, Assistant Examiner

U.S. Cl. X.R.
260—999